(12) United States Patent
Tetreault et al.

(10) Patent No.: US 11,101,654 B2
(45) Date of Patent: Aug. 24, 2021

(54) SYSTEM AND METHOD FOR DETERMINING MASTER/SLAVE SWITCHES IN A MULTI-WAY SWITCH SYSTEM

(71) Applicant: Hubbell Incorporated, Shelton, CT (US)

(72) Inventors: Michael Dennis Tetreault, Simsbury, CT (US); Nicholas Charles Kraus, Enfield, CT (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 16/599,173

(22) Filed: Oct. 11, 2019

(65) Prior Publication Data

US 2020/0136386 A1 Apr. 30, 2020

Related U.S. Application Data

(60) Provisional application No. 62/749,709, filed on Oct. 24, 2018.

(51) Int. Cl.
*F21V 23/04* (2006.01)
*H02J 13/00* (2006.01)
*H04W 84/20* (2009.01)
*H02J 3/00* (2006.01)
*G05B 15/02* (2006.01)
*H05B 47/19* (2020.01)

(52) U.S. Cl.
CPC .............. *H02J 3/005* (2013.01); *F21V 23/04* (2013.01); *G05B 15/02* (2013.01);
(Continued)

(58) Field of Classification Search
CPC ..... F21V 23/04; F21V 23/0435; G05B 15/02; G05B 2219/2642; H02J 3/005;
(Continued)

(56) References Cited

U.S. PATENT DOCUMENTS 8,461,503 B2 6/2013 Leinen
8,890,418 B2 11/2014 Mohan et al.
(Continued)

FOREIGN PATENT DOCUMENTS

JP 2016-73003 5/2016
WO WO 2016/073272 5/2016

OTHER PUBLICATIONS

PCT International Search Report and Written Opinion for corresponding PCT Application No. PCT/US19/55778, dated Jan. 10, 2020, 9 pages.

(Continued)

*Primary Examiner* — Levi Gannon
(74) *Attorney, Agent, or Firm* — Michael Best & Friedrich LLP

(57) ABSTRACT

A power switch configured for use in a multi-way switch system is provided. The power switch includes one or more switching elements configured to selectively couple a load to a power source. The power switch includes a power metering circuit and a communications circuit. The communications circuit can be configured to provide communications between the power switch and at least one other power switch in the switch system. The power switch can include a control device configured obtain data from the power metering circuit. The data can be indicative of power consumption of the load. The control device can be further configured to determine whether the power switch is a master power switch in the multi-way switch system based on the data.

20 Claims, 6 Drawing Sheets

(52) U.S. Cl.
CPC ....... *H02J 13/00026* (2020.01); *H04W 84/20* (2013.01); *H05B 47/19* (2020.01)

(58) Field of Classification Search
CPC .. H02J 13/00; H02J 13/00026; H02J 2310/12; H04L 12/28; H04L 12/2803; H04W 84/20; H05B 47/19
USPC ........................................................ 307/113
See application file for complete search history.

(56) References Cited

U.S. PATENT DOCUMENTS

| | | | |
|---|---|---|---|
| 9,713,231 B2 | 7/2017 | Kelly et al. | |
| 2005/0070760 A1* | 3/2005 | Hillis | H05B 47/18 600/109 |
| 2007/0285027 A1 | 12/2007 | Gehman | |
| 2011/0080046 A1 | 4/2011 | Lee et al. | |
| 2013/0038234 A1 | 2/2013 | Van Der Veen et al. | |
| 2014/0103823 A1 | 4/2014 | Kahlman et al. | |
| 2014/0253483 A1 | 9/2014 | Kupersztoch et al. | |
| 2015/0005900 A1 | 1/2015 | Steele et al. | |
| 2015/0012151 A1 | 1/2015 | Park | |
| 2015/0280440 A1* | 10/2015 | Wootton | H02J 13/00 307/115 |
| 2017/0117891 A1* | 4/2017 | Lohbihler | G08C 17/02 |
| 2017/0234562 A1 | 8/2017 | Ribbich et al. | |
| 2018/0173416 A1 | 6/2018 | Baldwin et al. | |

OTHER PUBLICATIONS

Biery et al, "Controlling LEDs," Technical white paper, Lutron Electronics Co., Inc., May 2014—20 pages.

* cited by examiner

SYSTEM AND METHOD FOR DETERMINING MASTER/SLAVE SWITCHES IN A MULTI-WAY SWITCH SYSTEM

PRIORITY CLAIM

The present application claims the benefit of priority of U.S. Provisional App. No. 62/749,709, titled "System and Method for Determining Master/Slave Switches in a Multi-Way Switch System," having a filing date of Oct. 24, 2018, which is incorporated by reference herein.

FIELD

The present disclosure relates generally to multi-way switch systems used to control power delivery to a load from more than one location.

BACKGROUND

In-wall devices can include devices that can be mounted on or at least partially disposed in a wall or other surface (e.g., in a wall mounted electrical box). Example in-wall devices can include power switches used to control various powered devices, such as electronics, light sources, appliances, power outlets, and other devices. Power switches can control power delivered to a load, for instance, by interrupting a conductor delivering power to a load. Example power switches can include, for instance, single or multiple on/off toggle switches, paddle or rocker switches, single or multiple pole dimmer switches, power outlets, etc.

SUMMARY

Aspects and advantages of embodiments of the present disclosure will be set forth in part in the following description, or may be learned from the description, or may be learned through practice of the embodiments.

One example aspect of the present disclosure is directed to a power switch configured for use in a multi-way switch system. The power switch includes one or more switching elements configured to selectively couple a load to a power source. The power switch includes a power metering circuit. The power switch includes a communication circuit configured to provide communication between the power switch and at least one other power switch in the multi-way switch system. The power switch includes one or more control devices. The one or more control devices are configured to obtain data from the power metering circuit. The data can be indicative of power consumption of the load. The one or more control devices can be configured to determine whether the power switch is a master power switch in the multi-way switch system based, at least in part, on the data from the power metering circuit.

Another example aspect of the present disclosure is directed to a method for determining a master power switch in a multi-way switch system comprising at least a first power switch and a second power switch. The method includes obtaining, by one or more control devices of the first power switch, data indicative of a load coupled to a power source via the first power switch. The method further includes determining, by the one or more control devices, the first power switch is the master power switch in the multi-way switch system based, at least in part, on the data. Yet another example aspect of the present disclosure is directed to a multi-way switch system. The multi-way switch system can include at least a first power configured to selectively couple a load to a power source. The multi-way switch system can further include at least a second power switch in communication with the first power switch. The first power switch can include one or more control devices configured to receive data indicative of the load being coupled to the power source via the first power switch. The one or more control devices can be further configured to determine the first power switch is a master power switch in the multi-way switch system based, at least in part, on the data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
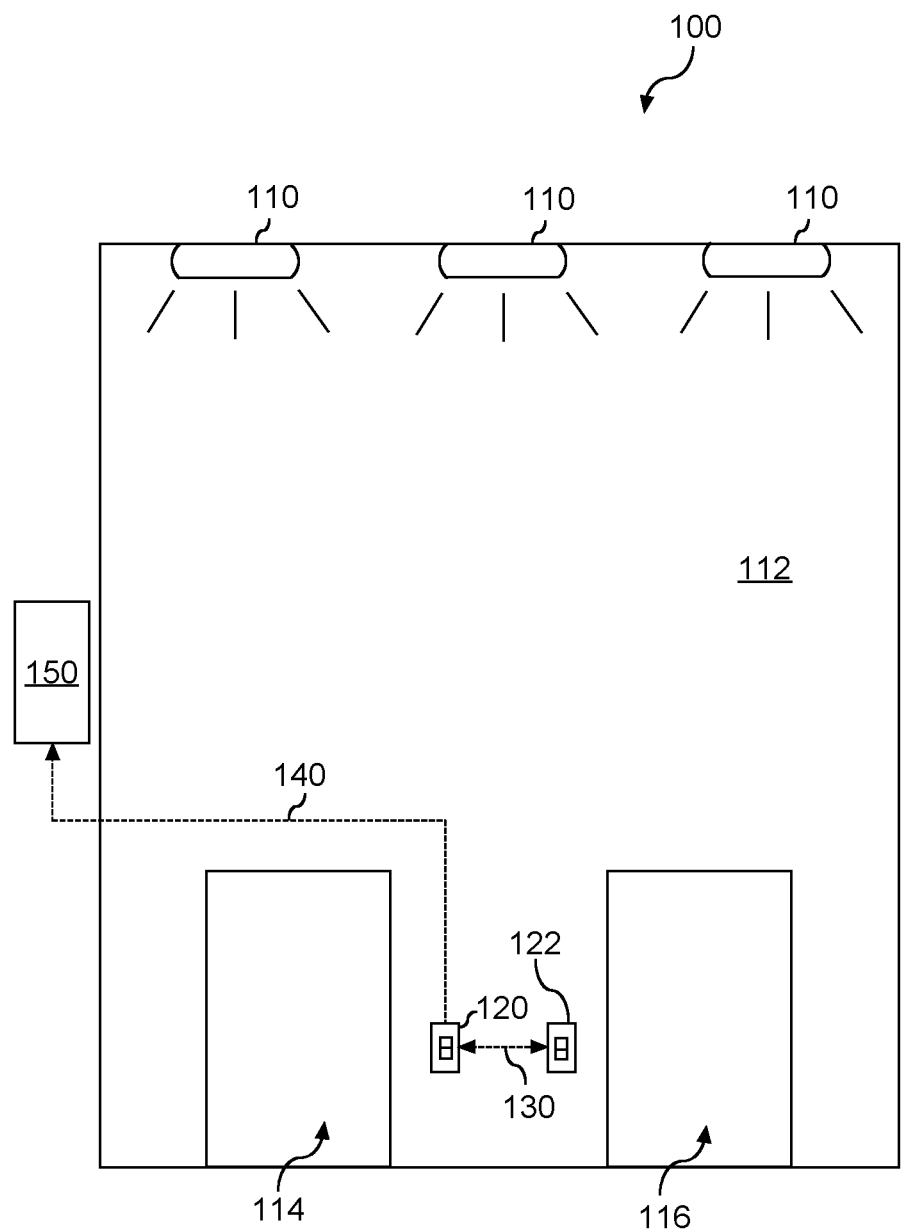
FIG. 1 depicts a schematic of a multi-way switch system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a multi-way switch system (e.g., 3-way switch system, 4-way switch system, etc.). The multi-way switch system can include at least a first power switch and a second power switch that is communicatively coupled to the first power switch. In some implementations, the second power switch can be located at a different location relative to the first power switch. For instance, the first power switch can be located at a bottom of a staircase. In contrast, the second power switch can be located at a top of the staircase. As will be discussed below in more detail, the first power switch and the second power switch can be configured to control power delivery to a load (e.g., lighting fixture, ceiling fan, etc.).

In some implementations, the first power switch can be coupled between a power source (e.g., mains power source) and the load. In this manner, the first power switch can be configured to selectively couple the load to the power source based on commands (e.g., user input) received at the first power switch. In addition, the first power switch can be configured to selectively couple the load to the power source based, at least in part, on commands received at the second power switch and provided over a network to the first power switch. In this manner, the power delivery to the load can be controlled from more than one location (e.g., first power switch and second power switch). As will be discussed below in more detail, the first power switch and the second power switch of the multi-way switch system can be configured to automatically determine which is a master power switch and which is a slave power switch.

As used herein, the term "master power switch" refers to a power switch that controls power delivery to a load. The term "slave power switch" refers to a power switch that is communicatively coupled with a master power switch and controls power delivery to the load via the master power switch. The term "multi-way switch system" refers to a multi-way switch system that includes a master power switch and one or more slave power switches.

In some implementations, the first power switch and the second power switch can each include a power metering circuit. For instance, the power metering circuit of the first power switch can be coupled to one or more conductors (e.g., wires) coupling the first power switch to the load. In contrast, the power metering circuit of the second power switch is not coupled to the one or more conductors coupled to the load. As will be discussed below in more detail, the first power switch and the second power switch can each include one or more control devices configured to obtain data from a corresponding power metering circuit and determine based, at least in part, on the data whether a corresponding power switch is a master power switch or a slave power switch in the multi-way switch system.

The one or more control devices of the first power switch can be configured to obtain data from the power metering circuit of the first power switch. As discussed above, the power metering of the first power switch is coupled to the one or more conductors coupling the first power switch to the load. As such, the data obtained from the power metering circuit of the first power switch can be indicative of the load receiving power from the power source. In this manner, the one or more control devices of the first power switch can determine based, at least in part, on the data that the first power switch is the master power switch in the multi-way switch system.

The one or more control devices of the second power switch can be configured to obtain data from the power metering circuit of the second power switch. As discussed above, the power metering circuit of the second power switch is not coupled to the one or more conductors coupled to the load. As such, the data the one or more control devices obtain from the power metering circuit of the second power switch is not indicative of the load receiving power from the power source. In this manner, the one or more control devices of the second power switch can determine based, at least in part, on the data that the second power switch is a slave power switch in the multi-way switch system.

The multi-way switch system according to example aspects of the present disclosure provides numerous technical benefits. For instance, the multi-way switch system eliminates the need for a user to manually configure power switches in the multi-way switch system as a master power switch or a slave power switch. In this manner, the multi-way switch system of the present disclosure eliminates the potential for a user to incorrectly configure the power switches of the multi-way switch system.

Referring now to the Figures, FIG. 1 depicts a lighting system 100 incorporating a plurality of power switches according to example embodiments of the present disclosure. The lighting system 100 includes one or more lighting fixtures 110 (e.g., luminaries) operable to provide illumination for a space 112 (e.g., a room). The lighting system 100 can include a first power switch 120 and a second power switch 122. It should be appreciated, however, that the lighting system 100 can include more power switches without deviating from the scope of the present disclosure. In some embodiments, the first power switch 120 can be arranged near a first entrance 114 into the space 112. The second power switch 122 can be arranged near a second entrance 116 to the space 112. The first power switch 120 and the second power switch 122 can be configured to control power delivery to the one or more lighting fixtures 110 (or other powered loads) to control lighting with the space 112. In some embodiments, the first power switch 120 and the second power switch 122 can provide 3-way switch functionality (or other multi-way switching functionality with other switches in the system, such as 4-way switch functionality).

Although the first power switch 120 and the second power switch 122 of the lighting system 100 are discussed with reference to controlling power delivery to one or more lighting fixtures 110, it should be appreciated that the first power switch 120 and the second power switch 122 can each be configured to control power delivery to any suitable load. For instance, in some implementations, at least one of the first power switch 120 and the second power switch 122 can be configured to control power delivery to one or more ceiling fans disposed within the space 112.

In some implementations, the first power switch 120 can be a master power switch. In addition, the second power switch 122 can be a slave power switch that is in communication with the first power switch 120 over a wireless communication link 130 (e.g., Bluetooth Low Energy communication link or other suitable communication link). User interaction with the second power switch 122 can cause data to be communicated to the first power switch 120 over the wireless communication link 130 to control power delivery to the one or more light sources. The first power switch 120 can be further configured to communicate with other devices 150 (e.g., user devices, cloud computing systems, servers, etc. over a second communication link 140 via one or more networks. In this manner, a user can interact remotely with the second power switch 122 by communicating with the first power switch 120, which then relays data and other information over the wireless communication link 130 to the second power switch 122.

Figure 2:
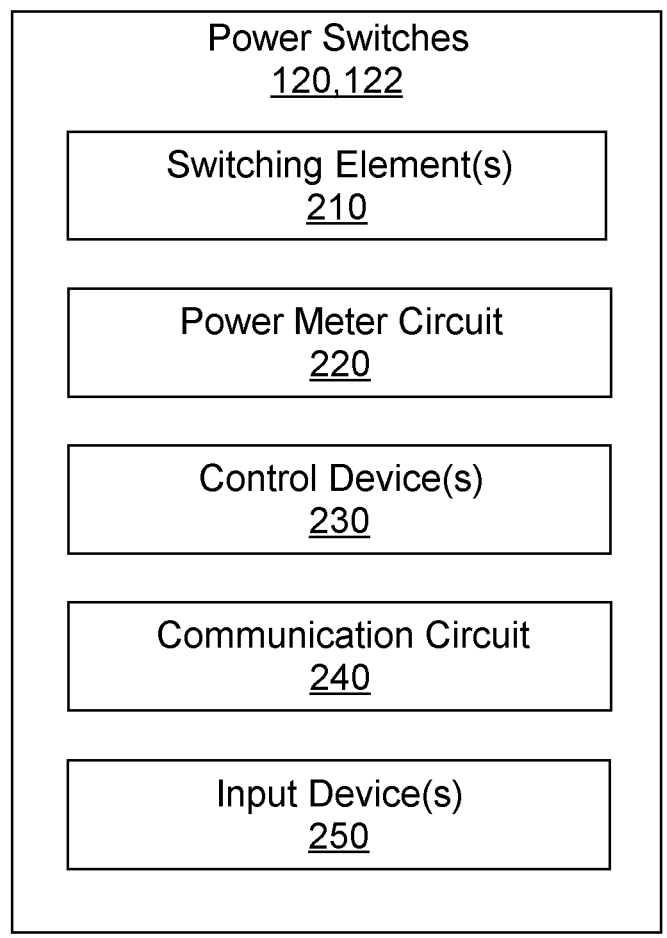
FIG. 2 depicts a block diagram of a power switch of a multi-way switch system according to example embodiments of the present disclosure.

FIG. 2 illustrates suitable components of the first power switch 120 and the second power switch 122 according to example embodiments of the present disclosure. As shown, the first power switch 120 and the second power switch 122 can each include one or more switching elements 210 configured to selectively couple a load (e.g., luminaries) to a power source (e.g., AC mains). In example embodiments, the one or more switching elements 210 can transition between a first state and a second state. When the one or more switching elements 210 are in the first state, power is delivered from the power supply to the load. In contrast, power is not delivered from the power source to the load when the one or more switching elements 210 are in the second state. It should be appreciated that the one or more switching elements 210 can include any suitable device configured to control power delivery to the load. For instance, in some implementations, the one or more switching elements 210 can include one or more contactors. Alternatively, the one or more switching element 210 can include one or more transistors, one or more silicon controlled rectifier (SCR), one or more TRIACs, or any other suitable device configured to control power delivery to the load (e.g., lighting fixture).

In some implementations, the first power switch 120 and the second power switch 122 can each include a power metering circuit 220. The power metering circuit 220 can be configured to detect (e.g., measure) power consumption of one or more loads (e.g., luminaire) coupled to a power source (e.g., AC mains) via the one or more switching elements 210. It should be appreciated that the power metering circuit 220 can include one or more current sensors and/or voltage sensors.

Figure 3:
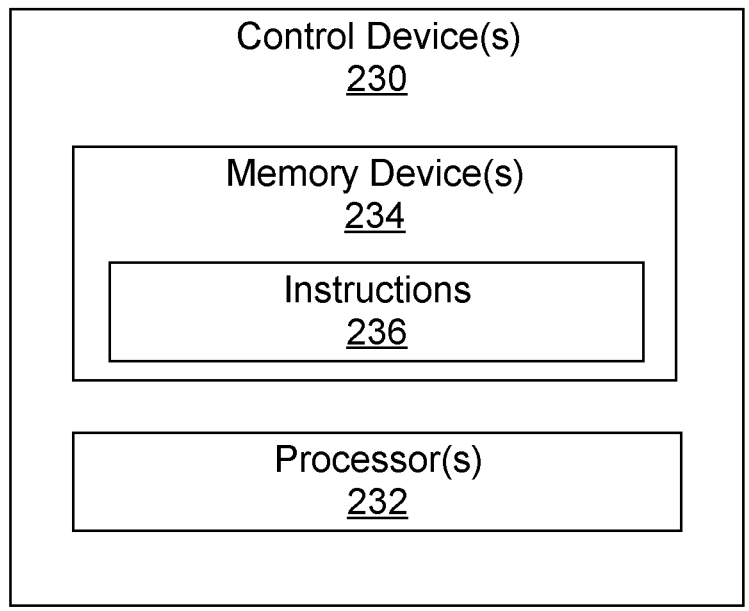
FIG. 3 depicts a block diagram of a control device according to example embodiments of the present disclosure.

In some implementations, the first power switch 120 and the second power switch 122 can each include one or more control devices 230. FIG. 3 illustrates one embodiment of suitable components of the control device(s) 230. As shown, the control device(s) 230 can include one or more processors 232 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the control device(s) 230 can include a memory device 234. Examples of the memory device 234 can include computer-readable media including, but not limited to, non-transitory computer-readable media, such as RAM, ROM, hard drives, flash drives, or other suitable memory devices. The memory device 234 can store information accessible by the processor(s) 232, including computer-readable instructions 236 that can be executed by the processor(s) 232. The computer-readable instructions 236 can be any set of instructions that, when executed by the processor(s) 232, cause the processor(s) 232 to perform operations. The computer-readable instructions 236 can be software written in any suitable programming language or can be implemented in hardware.

In some implementations, the computer-readable instructions 236 can be executed by the processor(s) 232 to perform operations, such as controlling power delivery to one or more loads. For instance, controlling power delivery to the one or more loads can include controlling operation of the one or more switching elements 210 to selectively couple the one or more loads to the power source (not shown). Alternatively, controlling power delivery to the load may also include providing one or more commands to another power switch to control power delivery to the load. More specifically, the one or more commands can be provided to a power switch that is coupled between the power source and the load.

In some implementations, the first power switch 120 and the second power switch 122 can each include a communication circuit 240. The communication circuit 240 can include associated electronic circuitry that can be used to communicatively couple the control device(s) 230 with other devices, such as control device(s) 230 associated with other power switches. In some implementations, the communication circuit 240 can allow the control device(s) 230 to communicate directly with the other devices. In other implementations, the communication circuit 240 can provide for communication with the other devices over a network.

The network can be any suitable type of network, such as a Power-Over-Ethernet (POE) network, a local area network (e.g., intranet), a wide area network (e.g., internet), a low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), Power over Ethernet, etc. Other suitable wired and/or wireless communication technologies can be used without deviating from the scope of the present disclosure.

Referring briefly again to FIG. 2, the first power switch 120 and the second power switch 122 can each include one or more input devices 250 communicatively coupled with the one or more control devices 230. In some implementations, the one or more input devices 250 can include a press-button, a rocker switch, a paddle switch, or a rocker switch. It should be appreciated, however, that the one or more input devices 250 can include any suitable type of input device. As will be discussed below in more detail, the one or more input device 250 can be manipulated to initiate a configuration sequence implemented by the one or more control devices 230 to determine whether a corresponding power switch is a master power switch in a multi-way switch system or a slave power switch in the multi-way switch system.

Figure 4:
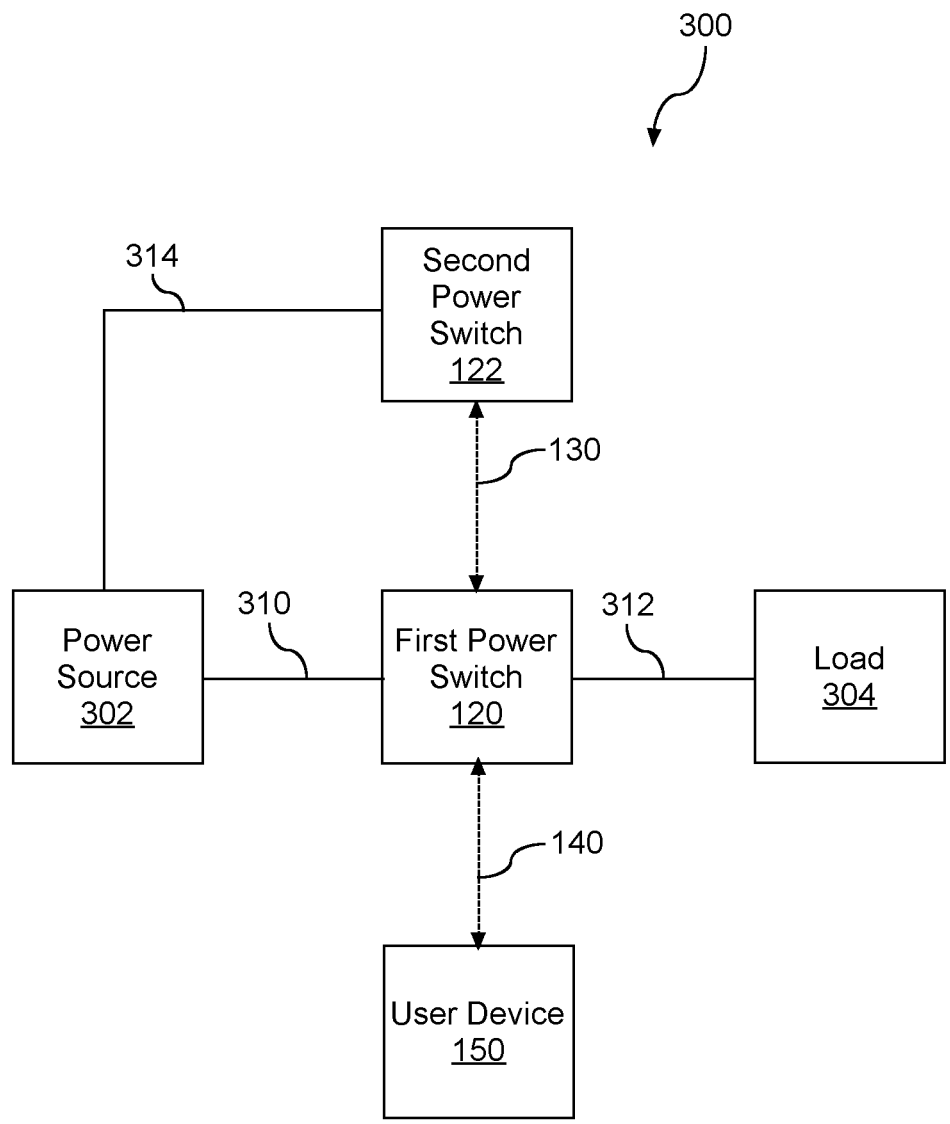
FIG. 4 depicts another schematic of a multi-way switch system according to example embodiments of the present disclosure.

FIG. 4 depicts a block diagram of a multi-way switch system 300 for controlling power delivery to a load (e.g., lighting fixtures) according to example embodiments of the present disclosure. As shown, the multi-way switch system 300 includes the first power switch 120 and the second power switch 122 discussed above with reference to FIGS. 1 and 2. It should be appreciated that the multi-way switch system 300 can include more power switches. As will be discussed below in more detail, a master power switch in the multi-way switch system 300 and a slave power switch in the multi-way switch system 300 can be determined based, at least in part, on data obtained from the power metering circuit 220 (FIG. 2) associated with the first power switch 120 and the second power switch 122.

In example embodiments, the first power switch 120 can be coupled between a power source 302 (e.g., AC mains) and a load 304, such as the one or more lighting fixtures 110 discussed above with reference to FIG. 1. As shown, the first power switch 120 can be coupled to the power source 302 via a first set of conductors 310 (e.g., wires). In addition, the first power switch 120 can be coupled to the load 304 via a second set of conductors 312 (e.g., wires). In some implementations, the second power switch 122 can be coupled to the power source 302 via a third set of conductors 316 (e.g., wires). In alternative implementations, the second power switch 122 may not be coupled to the power source 302. Instead, the second power switch 122 can include an energy storage device (e.g., battery) configured to provide power to one or more components (e.g., control device(s), communications circuit, etc.) of the second power switch 122.

In example embodiments, the power metering circuit 220 (FIG. 2) of the first power switch 120 can be coupled to the second set of conductors 312. In this manner, the power metering circuit 220 of the first power switch 120 can detect power consumption of the load 304. More specifically, the power metering circuit 220 of the first power switch 120 can detect the load 304 receiving power from the power source 302. In contrast, the power metering circuit 220 (FIG. 2) of the second power switch 122 is not coupled to the second set of conductors 312. As such, the power metering circuit 220 of the second power switch 122 cannot detect power consumption of the load 304. As will be discussed below, the one or more control devices 230 (FIG. 2) of the first power switch 120 and the second power switch 122 can be configured to implement a configuration sequence (e.g., logic) to determine a master power switch in the multi-way switch system 300 and a slave power switch in the multi-way switch system 300 based, at least in part, on data obtained from the corresponding power metering circuit.

In some implementations, the configuration sequence can configure the one or more control devices 230 to obtain data from the power metering circuit 220. The configuration sequence can further configure the one or more control devices 230 to determine whether the corresponding power switch is a master power switch or a slave power switch based, at least in part, on the data obtained from the power metering circuit 220.

The one or more control devices 230 of the first power switch 120 can determine the first power switch 120 is the master power switch in the multi-way switch system 300 based, at least in part, on the data obtained from the power metering circuit 220 of the first power switch 120. More specifically, the data can indicate that the load 304 is receiving electrical power from the power source 302. In this manner, the one or more control devices 230 of the first power switch 120 can determine the first power switch 120 is coupled to the load 304 via the second set of conductors 312 and, as a result, corresponds to the master power switch in the multi-way switch system 300.

In contrast, the one or more control devices 230 of the second power switch 122 can determine the second power switch 122 is the slave power switch in the multi-way switch system 300 based, at least in part, on the data obtained from the power metering circuit 220 of the second power switch 122. More specifically, since the power metering circuit 220 of the second power switch 122 is not coupled to the second set of conductors 312, the data obtained from the power metering circuit 220 does not indicate the load 304 is receiving electrical power from the power source 302. In this manner, the one or more control devices 230 can determine the second power switch 122 is not coupled to the load 304 via the second set of conductors 312 and, as a result, corresponds to the slave power switch in the multi-way switch system 300.

In some implementations, the one or more control devices 230 of the first power switch 120 can implement a pairing operation with the second power switch 122 in response to determining the first power switch 120 corresponds to the master power switch in the multi-way switch system 300. More specifically, the first power switch 120 can be paired with the second power switch 122 such that the second power switch 122 is a slave power switch in the multi-way switch system 300.

It should be appreciated that the one or more control devices 230 can be configured to implement the configuration sequence in response to a trigger event. For instance, in some implementations, the one or more control devices 230 can be configured to implement the configuration sequence in response to receiving user input via the one or more input devices 250 (FIG. 2) associated with the first power switch 120 and the second power switch 122. Alternatively or additionally, the one or more control devices 230 can be configured to implement the configuration sequence in response to receiving user input via other devices 150 (e.g., user device) that are communicatively coupled to the first power switch 120 via the second communication link 140. In some implementations, the one or more control devices 230 can be configured to implement the configuration sequence at predetermined intervals of time. For instance, the one or more control devices 230 can be configured to implement the configuration sequence once every four hours. It should be appreciated, however, that the one or more control devices 230 can be configured to implement the configuration sequence at any suitable interval of time.

In some implementations, the one or more control devices 230 of the first power switch 120 (e.g., the master power switch) can obtain one or more control signals from the second power switch (e.g., the slave power switch). For instance, the one or more control signals can be indicative of a command to couple the load 304 to the power source 302. Alternatively, the one or more control signals can be indicative of a command to decouple the load 304 from the power supply. It should be understood that the one or more control devices 230 of the first power switch 120 (e.g., the master power switch) can be configured to control operation of one or more switching elements 210 (FIG. 2) of the first power switch 120 based, at least in part, on the one or more control signals obtained from the second power switch 122. For instance, the one or more control devices 230 of the first power switch 120 can be configured to control operation of the one or more switching elements 210 of the first power switch 120 to couple the load 304 to the power source 302 via the first power switch 120. Alternatively, the one or more control devices 230 of the first power switch 120 can be configured to control operation of the one or more switching elements 210 of the first power switch 120 to decouple the load 304 from the power source 302. In this manner, the one or more control devices 230 of the first power switch 120 (e.g., master power switch) can selectively couple the load 304 to the power source 302 based, at least in part, on one or more control signals obtained from the second power switch 122 (e.g., the slave power switch).

Figure 5:
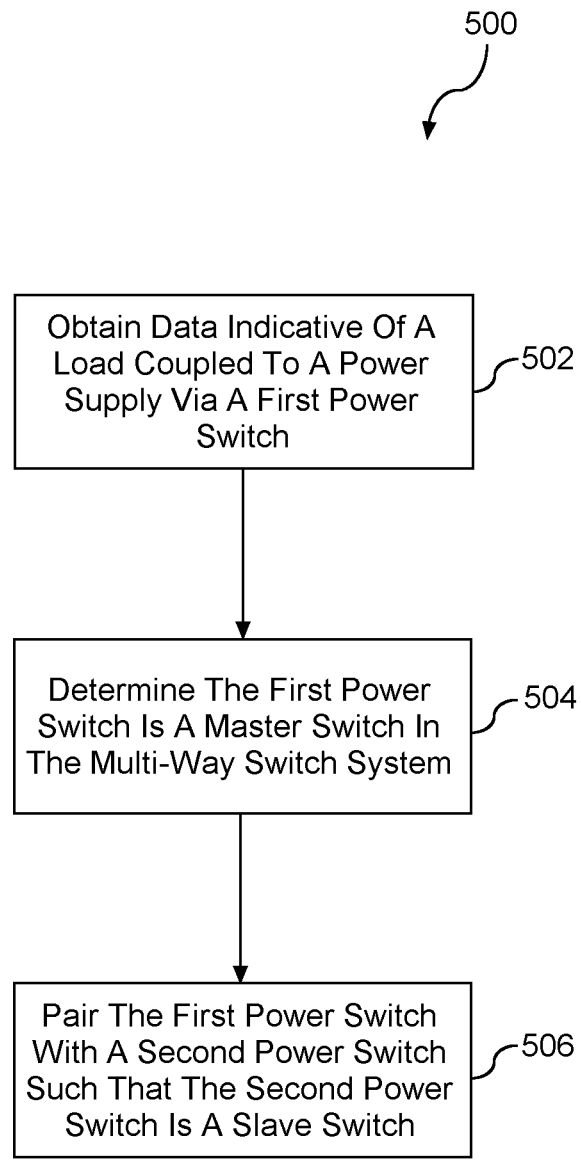
FIG. 5 depicts a flow diagram of a method for determining a master power switch in a multi-way switch system according to example embodiments of the present disclosure.

Referring now to FIG. 5, a flow diagram of a method 500 for determining a master power switch in a multi-way switch system that includes at least a first power switch and a second power switch is provided according to example embodiments of the present disclosure. It should be appreciated that the method 500 can be implemented using the multi-way switch system discussed above with reference to FIG. 4. FIG. 5 depicts steps performed in a particular order for purposes of illustration and discussion. Those of ordinary skill in the art, using the disclosures provided herein, will understand that various steps of the method 500 may be adapted, modified, rearranged, performed simultaneously or modified in various ways without deviating from the scope of the present disclosure.

At (502), the method 500 includes obtaining, by one or more control device of the first power switch, data indicative of power consumption of a load coupled to a power source via the first power switch. In example embodiments, the one or more control devices can obtain the data in response to a trigger event. For instance, the one or more control devices of the first power switch can obtain the data in response to receiving user input received via manipulation of one or more input devices associated with the first power switch. Alternatively, the one or more control devices of the first power switch can obtain the data in response to receiving one or more commands from a remote computing device, such as a smartphone, tablet, etc. In some implementations, the one or more control devices of the first power switch can obtain the data at predetermined intervals of time. For instance, the one or more control devices of the first power switch can be configured to obtain the data once every four hours.

At (504), the method 500 includes determining, by the one or more control devices, the first power switch is the master power switch in the multi-way switch system based, at least in part, on the data obtained at (502).

At (506), the method 500 includes pairing, by the one or more control devices, the first power switch with the second power switch such that the second power switch is a slave power switch in the multi-way switch system. In example embodiments, the first power switch can provide one or more commands over a communication link to the second power switch. The one or more commands can include an identification code the second power switch can use to establish communications between the first power switch and the second power switch.

Figure 6:
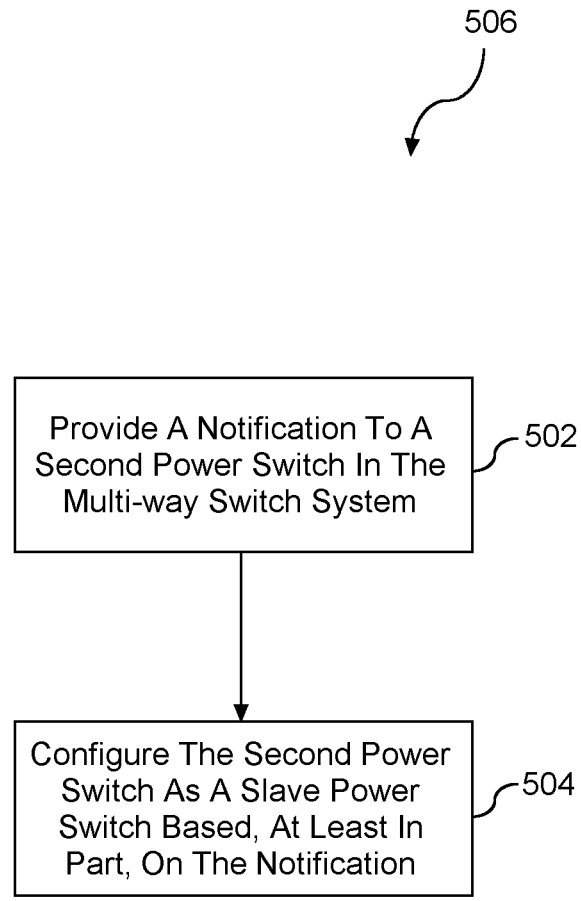
FIG. 6 depicts a flow diagram of a method for pairing a first power switch in a multi-way switch system with a second power switch in the multi-way switch system according to example embodiments of the present disclosure.

Referring briefly now to FIG. 6, a flow diagram of pairing the first power switch with a second power switch in the multi-way system is provided according to example embodiments of the present disclosure. FIG. 6 depicts steps performed in a particular order for purposes of illustration and discussion. Those of ordinary skill in the art, using the disclosures provided herein, will understand that various steps of the method 500 may be adapted, modified, rearranged, performed simultaneously or modified in various ways without deviating from the scope of the present disclosure.

At (602), the pairing operation 506 can include providing, by one or more control devices of the first power switch, a notification to the second power switch. In example embodiments, the notification can be indicative of the second power switch being a slave power switch in the multi-way switch system. For instance, in some embodiments, the notification can indicate that the first power switch is the master power switch in multi-way switch system. In this manner, the one or more control devices of the second power switch can, upon receiving the notification, be configured to determine the second power switch is a slave power switch in the multi-way switch system.

At (604), the pairing operation 506 can include configuring the second power switch as a slave power switch in the multi-way switch system based, at least in part, on the notification. For instance, the one or more control devices of the second power switch can be configured to store the notification in memory associated with the one or more control devices. Alternatively or additionally, the one or more control devices can configure one or more components of the second power switch based on the second power switch being a slave power switch in the multi-way switch system.

It should be appreciated that the first power switch (e.g., the master power switch) can be paired with additional slave power switches in the multi-way switch system. For instance, in some implementations, the multi-way switch system can include a third power switch to provide 4-way switching capability. In such implementations, the first power switch (e.g., the master power switch) can be paired with the third power switch in much the same manner as the pairing of the first and second power switches discussed above. For instance, the first power switch can be paired with the third power switch such that the third power switch is a slave power switch in the multi-way switch system.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A power switch configured for use in a multi-way switch system, comprising:
   one or more power switching elements configured to selectively couple a load to a power source;
   a power metering circuit configured to detect data indicative of power consumption of the load;
   a communication circuit configured to provide communication between the power switch and at least one other power switch in the multi-way switch system; and
   one or more control devices configured to:
      obtain, via the power metering circuit, the detected data indicative of the power consumption of the load;
      determine whether the detected data indicative of the power consumption of the load indicates that the load is receiving power; and
      based, at least in part, on determining that the detected data indicative of the power consumption of the load indicates that the load is receiving power:
         determine that the power switch is a master power switch in the multi-way switch system; and
         control the communication circuit to transmit a pairing notification to the at least one other power switch in the multi-way switch system, wherein the pairing notification indicates that the power switch is the master power switch.

2. The power switch of claim 1, wherein the pairing notification includes information that is useable to pair the power switch with the at least one other power switch such that the at least one other power switch is a slave power switch.

3. The power switch of claim 2, wherein the one or more control devices are further configured to:
   obtain one or more control signals from the slave power switch; and
   control operation of the one or more power switching elements of the master power switch based, at least in part, on the one or more control signals.

4. The power switch of claim 3, wherein the one or more control signals comprise a command to couple the load to the power source via the one or more power switching elements of the master power switch.

5. The power switch of claim 3, wherein the one or more control signals comprise a command to decouple the load from the power source via the one or more power switching elements of the master power switch.

6. The power switch of claim 1, wherein the power source comprises an alternating current (AC) power source.

7. The power switch of claim 1, wherein the load comprises a lighting fixture.

8. The power switch of claim 1, wherein the load comprises a ceiling fan.

9. The power switch of claim 1, wherein the pairing notification includes an identification code for establishing communications between the power switch and the at least one other power switch in the multi-way switch system.

10. A method for determining a master power switch in a multi-way switch system including at least two power switches, the method comprising:
obtaining, by a control device of a first power switch, detected data indicative of power consumption of a load coupled to a power source via the first power switch;
determining, by the control device of the first power switch, whether the detected data indicative of the power consumption of the load indicates that the load is receiving power; and
based, at least in part, on determining that the detected data indicative of the power consumption of the load indicates that the load is receiving power:
determining, by the control device of the first power switch, that the first power switch is the master power switch in the multi-way switch system; and
transmitting, by the control device of the first power switch, a pairing notification to at least one other control device of at least one other power switch in the multi-way switch system, wherein the pairing notification indicates that the first power switch is the master power switch.

11. The method of claim 10, wherein the obtaining the detected data indicative of the power consumption of the load comprises obtaining, by the control device of the first power switch, the detected data indicative of the power consumption of the load coupled to the power source via the first power switch from a power metering circuit of the first power switch.

12. The method of claim 10, further comprising:
pairing, by a control device of a second power switch, the first power switch with the second power switch such that the second power switch is a slave power switch in the multi-way switch system.

13. The method of claim 12, wherein the pairing of the first power switch with the second power switch comprises:
providing, by the control device of the first power switch, the pairing notification a notification to the control device of the second power switch, the pairing notification being indicative of the second power switch being the slave power switch in the multi-way switch system; and
configuring, by the control device of the second power switch, the second power switch as the slave power switch based, at least in part, on the pairing notification.

14. The method of any claim 12, further comprising:
pairing the first power switch with a third power switch of the multi-way switch system such that the third power switch is another slave power switch in the multi-way switch system.

15. The method of claim 14, wherein the pairing of the first power switch with the third power switch comprises:
providing, by the control device of the first power switch, the pairing notification to a control device of the third power switch, the pairing notification indicating that the third power switch is the other slave power switch in the multi-way switch system; and
configuring, by the control device of the third power switch, the third power switch as the other slave power switch based, at least in part, on the pairing notification.

16. The method of claim 10, wherein the obtaining the detected data indicative of the power consumption of the load comprises obtaining, by the control device of the first power switch, the detected data indicative of the power consumption of the load coupled to the power source via the first power switch in response to a trigger event occurring.

17. The method of claim 16, wherein the trigger event comprises user input received via a user device that is communicatively coupled to the first power switch.

18. The method of claim 16, wherein the trigger event comprises user input received via one or more input devices associated with the first power switch.

19. A multi-way switch system, comprising:
a first power switch configured to selectively couple a load to a power source; and
a second power switch in communication with the first power switch, wherein one or more control devices of the first power switch are configured to:
receive detected data indicative of power consumption of the load;
determine whether the detected data indicative of the power consumption of the load indicates that the load is receiving power; and
based, at least in part, on determining that the detected data indicative of the power consumption of the load indicates that the load is receiving power:
determine that the first power switch is a master power switch in the multi-way switch system; and
transmit a pairing notification to the second power switch, wherein the pairing notification indicates that the first power switch is the master power switch.

20. The multi-way switch system of claim 19, wherein the one or more control devices are further configured to:
pair the first power switch with the second power switch such that the second power switch is a slave power switch in the multi-way switch system.

* * * * *